United States Patent [19]

Brocken et al.

[11] Patent Number: 5,371,732
[45] Date of Patent: Dec. 6, 1994

[54] METHOD OF DETECTING A ROUTING LOOP IN A TELECOMMUNICATION NETWORK, TELECOMMUNICATION NETWORK FOR USING THE METHOD, AND DETECTION MEANS FOR USE IN THE TELECOMMUNICATION NETWORK

[75] Inventors: Franciscus W. A. Brocken, Voorhout; Cyrillus G. J. Houben, Utrecht, both of Netherlands

[73] Assignee: Koninklijke PTT Nederland N.V., Groningen, Netherlands

[21] Appl. No.: 14,629

[22] Filed: Feb. 8, 1993

[30] Foreign Application Priority Data

Feb. 14, 1992 [NL] Netherlands ............... 9200279

[51] Int. Cl.⁵ .................. H04J 3/14; H04M 7/00
[52] U.S. Cl. ........................... 370/16; 370/54; 340/826; 379/272
[58] Field of Search ............... 370/13, 14, 15, 16, 370/16.1, 54, 60, 94.1; 379/5, 27, 29, 31, 32, 33, 269, 271, 272, 273; 340/825.03, 826, 827, 825.06, 825.16, 825.17

[56] References Cited

U.S. PATENT DOCUMENTS

| | | | |
|---|---|---|---|
| 4,736,363 | 4/1988 | Aubin et al. | 370/60 |
| 4,788,721 | 11/1988 | Krishnan et al. | 340/827 |
| 4,984,264 | 1/1991 | Katsube | 370/54 |
| 5,014,262 | 5/1991 | Harshavardhana | 370/16 |
| 5,077,730 | 12/1991 | Arrowood et al. | 370/16 |
| 5,086,428 | 2/1992 | Perlman et al. | 370/94.1 |
| 5,111,198 | 5/1992 | Kuszmaul | 370/94.1 |

FOREIGN PATENT DOCUMENTS

0423053A2 4/1991 European Pat. Off. .

OTHER PUBLICATIONS

Dutch Search Report.
Computer Communications Review, "Internet Routing", pp. 271–282, by Thomas Narten, Sep. 4, 1989, New York.

Primary Examiner—Alpus H. Hsu
Attorney, Agent, or Firm—Frishauf, Holtz, Goodman & Woodward

[57] ABSTRACT

Known methods of detecting routing loops in telecommunication networks are cumbersome and time-consuming. In addition, the probability that an existing routing loop is even actually detected is too low. In a method of detecting a routing loop according to the invention, paths whose lengths are stored are assembled. As soon as the length of a (partly assembled) path exceeds a predetermined value which is greater than, or equal to, the largest existing path length in the telecommunication network, this indicates the existence of a routing loop.

9 Claims, 2 Drawing Sheets

METHOD OF DETECTING A ROUTING LOOP IN A TELECOMMUNICATION NETWORK, TELECOMMUNICATION NETWORK FOR USING THE METHOD, AND DETECTION MEANS FOR USE IN THE TELECOMMUNICATION NETWORK

BACKGROUND OF THE INVENTION

The invention relates to a method of detecting a routing loop in a telecommunication network equipped with nodes, each containing node-specific routing information, in which a path is assembled from a source node, on the one hand, to a destination node, on the other hand, on the basis of the node-specific routing information associated with the source node and the node-specific routing information associated with the nodes situated on the path.

Such a method is disclosed by U.S. Pat. No. 5,014,262. In the latter, two submethods are described: a first submethod for detecting a routing loop (call looping) and a second submethod for detecting inefficient routing (circuitous routing). The first submethod, which is carried out for each destination node, comprises four steps. In the first step, all the nodes which do not receive any traffic for the destination node are removed, and in the second step, all the nodes which do not transmit any traffic to the destination node are removed. These nodes which have to be removed can, after all, not form part of a routing loop. In the third step, all tee nodes which form part of so-called miniloops are dealt with. Two nodes form part of a miniloop if one of the nodes receives traffic for the destination node from the other node and the first node also transmits traffic to the other node. For technical reasons, a miniloop can never occur as a routing loop because, at the position of a node, which preceding node the traffic to be routed further originates from is known and said traffic will never, of course, need to be sent back to said previous node. In the fourth step, the nodes which do not form part of a routing loop are identified. Such a node must, for example, meet the criterion that, if the node transmits traffic to another node, said other node must not send any traffic back to the node concerned. How this criterion, which in fact only states in other words that no routing loop must be possible, must be met is unclear. One solution could be to investigate for all the nodes left over after the first three steps whether the node which has the most incoming and outgoing traffic and transmits traffic to particular nodes receives traffic back from said particular nodes via a longer path. The said node would then have to be removed and the remaining nodes would have to be investigated again, etc. Like the criterion stated, such investigations are, however, yet another formulation of the problem of detecting routing loops. This known method, which is in any case cumbersome and, consequently, time-consuming, furthermore has the disadvantage that it is uncertain whether existing routing loops are found with it.

SUMMARY OF THE INVENTION

The object of the invention is, inter alia, to provide a method of the type stated at the outset which is less cumbersome and detects the existence of routing loops with a probability bordering on certainty.

For this purpose, the method according to the invention has the characteristic that, during the assembly of a path, a parameter of said path is increased at each subsequent node situated on said path by one unit, the parameter, expressed in a number of units, of a partly assembled path being compared with a predetermined value and a partly assembled path whose parameter exceeds said value being detected as a path containing a routing loop.

The value of the parameter of the partly assembled path, expressed in the number of units, is at any instant equal to a number of connecting pieces which together forms said partly assembled path at that instant. Increasing the parameter by one unit at each subsequent node situated on the path is in this case equivalent to counting the number of connecting pieces, one connecting piece being a portion of the path situated between two consecutive nodes. Said parameter which, at an arbitrary instant, therefore specifies the length of the path assembled at that instant, is an indication of the existence of a routing loop. If the length of a partly assembled path, expressed in the number of connecting pieces which together forms the partly assembled path, exceeds the predetermined value, it can be concluded with a probability bordering on certainty that a routing loop exists. Said predetermined value could, for example, be chosen as equal to the total number of nodes which form part of the telecommunication network, or to a smaller value if said telecommunication network has a heavily meshed nature.

The invention is based on the insight that., in any telecommunication network, there must be one or more paths which have the greatest length and that, as soon as the length determined for a (partly assembled) path exceeds said greatest length, this would be the consequence of the presence of a routing loop in the said (partly assembled) path.

Although U.S. Pat. No. 5,014,262 discloses the detection of inefficient routing (circuitous routing) (with the aid of the second submethod mentioned earlier) by determining the length of an assembled path and then investigating whether said length is greater than necessary, which is done by comparing the length with a nominal value associated with the path, the U.S. Patent does not disclose the detection of a routing loop by determining the length of a (partly assembled) path and comparing it with the predetermined value, which is greater than, or equal to, the greatest possible path length in the telecommunication network. The method according to the invention consequently solves a problem which has existed for a long time and which is of great importance in view of the regular failure of large telecommunication networks in past years as a result of the existence of routing loops.

In a first embodiment, the method according to the invention has the characteristic that, of two nodes which are situated on the path to be assembled and which each have a direct routing possibility to the other in their routing information, not more than one of the two routing possibilities is used in assembling the path.

Two nodes which each have a direct routing possibility to the other in their routing information form a so-called miniloop, which can never occur as a routing loop for the technical reasons mentioned earlier. The first embodiment of the method according to the invention takes account of this by using not more than one of the two routing possibilities.

In a second embodiment, the method according to the invention has the characteristic that all the nodes function consecutively as destination nodes, all the remaining nodes consecutively functioning as source node for each destination node.

In this process, all the paths between, on the one hand, all the possible source nodes and, on the other hand, all the possible destination nodes are investigated for the existence of routing loops. This can be done by assembling all the possible paths from one source node to the destination node and repeating this operation for all the remaining source nodes. It is also possible first to try to reach the destination node from the source nodes with a path to be formed of length 1 and then to repeat this operation for all the source nodes with a length which increases each time.

The invention furthermore relates to a telecommunication network for using the method according to the invention, equipped with nodes which each contain node-specific routing information, and detection means containing path assembly means for assembling a path from a source node, on the one hand, to a destination node, on the other hand, on the basis of the node-specific routing information associated with the source node and the node-specific routing information associated with nodes situated on the path.

The object of the invention is furthermore to provide a telecommunication network of the type described above which detects the existence of routing loops in a nonlaborious way with a probability bordering on certainty.

For this purpose, the telecommunication network according to the invention has the characteristic that the detection means are further equipped with counting means for increasing a counter position by one counting unit at each subsequent node situated on a path during the assembly of said path, and comparator means for comparing the counter position associated with a partly assembled path with a predetermined counter value and for generating an alarm signal in the event of it being exceeded.

In this connection, the counter position of the counting means, expressed in a number of counter units, is equivalent to the number of connecting pieces which together forms the (partly assembled) path and therefore specifies the length of said path. The comparator means are used to compare the counter position, and consequently the length of the partly assembled path, with the predetermined counter value which is greater than, or equal to, the path length which is the greatest possible in the telecommunication network and can be chosen, for example, as equal to the total number of nodes which form part of the telecommunication network. The alarm signal to be generated in the event of it being exceeded indicates the existence of a routing loop with a probability bordering on certainty.

In a first embodiment, the telecommunication network according to the invention has the characteristic that the detection means are equipped with ignoring means for ignoring at least one of the two routing possibilities in the assembly of a path in the case of two nodes which are situated on the path to be assembled and which each have a direct routing possibility to the other in their routing information.

Two such nodes which each have a direct routing possibility to the other in their routing information form a so-called miniloop which can never occur as a routing loop, as already described above. The first embodiment of the telecommunication system according to the invention comprises ignoring means for ignoring at least one of the two routing possibilities.

In a second embodiment, the telecommunication system according to the invention has the characteristic that the detection means are provided with selection means for successively selecting all the nodes as the destination node and for successively selecting all the remaining nodes as the source nodes for each destination node selected.

By using the selection means, all the paths in the telecommunication network between, on the one hand, all the possible source nodes and, on the other hand, all the possible destination nodes are investigated for the existence of routing loops.

The invention furthermore also relates to a detection system for use in the telecommunication system according to the invention, comprising path assembly means for assembling a path from a source node, on the one hand, to a destination node, on the other hand, on the basis of the node-specific routing information associated with the source node and the node-specific routing information associated with the nodes situated on the path.

The detection means according to the invention have the characteristic that the detection means are furthermore equipped with counting means for increasing a counter position by one counting unit at each subsequent node situated on a path during the assembly of said path, and comparator means for comparing the counter position associated with a partly assembled path with a predetermined counter value and for generating an alarm signal in the event of it being exceeded.

In a first embodiment, the detection means according to the invention have the characteristic that they are equipped with ignoring means for ignoring at least one of the two routing possibilities in the assembly of a path in the case of two nodes which are situated on the path to be assembled and which each have a direct routing possibility to the other in their routing information.

In a second embodiment, the detection means according to the invention have the characteristic that the detection means are provided with selection means for successively selecting all the nodes as the destination node and for successively selecting all the remaining nodes as the source node for each destination node selected.

The detection of a routing loop in the telecommunication network by assembling paths and then investigating whether the length of said paths exceeds a particular value can take place either by actually assembling paths or by assembling paths in a simulated manner. In the first case, the assembly is actually done on the basis of node-specific routing information associated with the nodes, while, in the second case, use could also be made of central memory means in which the node-specific routing information of all the nodes is stored.

BRIEF DESCRIPTION OF THE DRAWING

The invention will be explained in greater detail by reference to an exemplary embodiment shown in the figures. In the latter.

DESCRIPTION OF THE PREFERRED EMBODIMENT

Figure 1:
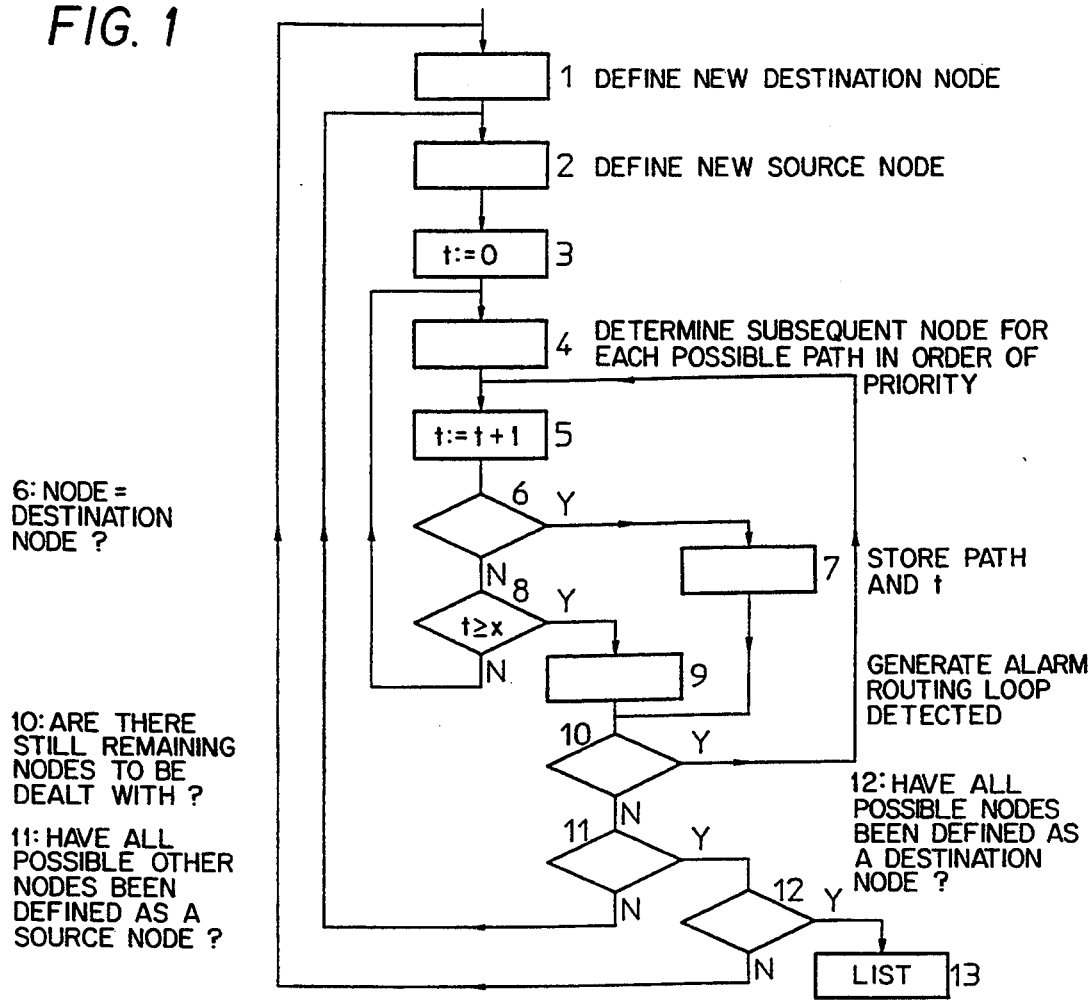
FIG. 1 shows a flow chart of an embodiment of the method according to the invention.

In the flow chart shown in FIG. 1, the blocks have the following meaning:

| | |
|---|---|
| Block 1 | define new destination node |
| Block 2 | define new source node |
| Block 3 | t: = 0 |
| Block 4 | determine the subsequent node situated on the path for each possible path between the source node and the destination node, in which process miniloops should be avoided, store the subsequent nodes found in this way along with an associated value of t and treat them in the order of priority |
| Block 5 | t: = t + 1 |
| Block 6 | is the node being dealt with the destination node? yes: proceed to block 7 no: proceed to block 8 |
| Block 7 | store the path found along with associated length t |
| Block 8 | is t ≧ x? yes: proceed to block 9 no: return to block 4 |
| Block 9 | generate alarm signal, routing loop detected |
| Block 10 | are there still remaining nodes (block 4) to be dealt with? yes: return to block 5 no: proceed to block 11 |
| Block 11 | have all the possible other nodes been defined as a source node in the case of the destination node defined? yes: proceed to block 12 no: return to block 2 |
| Block 12 | have all the possible nodes been defined as a destination node? yes: proceed to block 13 no: return to block 1 |
| Block 13 | list all the paths found, each with associated length t, and all the routing loops detected, each with associated source node and destination node. |

The method according to the invention as shown in the flow chart in FIG. 1 proceeds as follows. A destination node is chosen from all the nodes associated with the telecommunication network (block 1). For said destination node, a source node is then chosen from the remaining nodes (block 2) and a parameter t acquires the value 0 (block 3). On the basis of the node-specific routing information of the source node, for each possible path between the source node and the destination node, the subsequent node situated on said path is determined, miniloops being avoided (that is to say of two nodes which each have a direct routing possibility to the other, only one of said routing possibilities is used in the assembly of the path). All nodes found in this way are stored along with the associated value of t and dealt with in order of priority (block 4). The parameter t is increased by one unit (block 5) and whether it coincides with the destination node is investigated for the node point found with the highest priority (block 6). In the event of coincidence, a path has been found which is stored with the associated value of t which reproduces the length of said path, expressed in the number of connecting pieces which, in its entirety, forms the path (block 7). In the event of noncoincidence, whether the parameter t is greater than, or equal to, a predetermined value x is investigated (block 8). If this is so, a routing loop has been detected and an alarm signal is generated (block 9), and if this is not so, for each possible path between said node and the destination node, the subsequent node is determined on said path on the basis of the node-specific routing information of the highest-priority node found until all the possible paths between the highest-priority node found and the destination node have been assembled and any routing loops present have been detected.

Whether there are still remaining lower-priority nodes (cf. block 4) which have to be dealt with is then investigated (block 10). If these exist, they are again dealt with in order of priority, that is to say, for the highest-priority node of these remaining nodes, the parameter t is increased by one unit and whether it coincides with the destination node is investigated, etc., and if there are no remaining nodes present, whether all the nodes other than the definition node have already been defined as source node is examined (block 11). If this is not so, another node which has not yet been under discussion in the case of the given destination node is defined as source node, etc. (block 2), and if this is in fact so, whether all the nodes have already been defined as the destination node is investigated (block 12). If this is not so, another node which has not yet been under discussion is defined as the destination node, etc. (block 1), and if this is in fact so, a list is shown of all the paths found, each with associated length t, and of all the detected routing loops, each with associated source node and destination node (block 13).

It is pointed out that increasing the parameter t for each subsequent node situated on the path should be interpreted in a wide sense. Thus, for example, it is also already possible to increase the parameter t on ascending a subsequent connecting piece situated between two nodes, and the possibility must furthermore not be excluded that each new path is started with a fixed value for the parameter t in order subsequently to reduce said value for each subsequent node or connecting piece and, for example, to detect a routing loop with the value 0 (a disadvantage in this connection is that, in this case, the length of the path assembled is not directly available).

The exemplary embodiment described above on the basis of FIG. 1 relates to a method which could be used, for example, in the simulated assembly of paths. In the actual assembly of paths on the basis of the node-specific routing information associated with the nodes, use could also be made of a variation of this exemplary embodiment in which, for a given destination node, whether the destination node can be reached with paths of length 1 is first investigated from a particular source node, and whether the destination node can be reached from the source node with paths having a greater length is then investigated on the basis of the data determined above, which last operation is continuously repeated with steadily increasing length until, finally, either it is no longer possible to assemble paths having a greater length or the length of the path last assembled exceeds the predetermined value x, in which case a detection of a routing loop is involved. In this case, the value x is greater than the largest possible path length in the telecommunication network and is, for example, equal to the number of nodes present therein.

Figure 2:
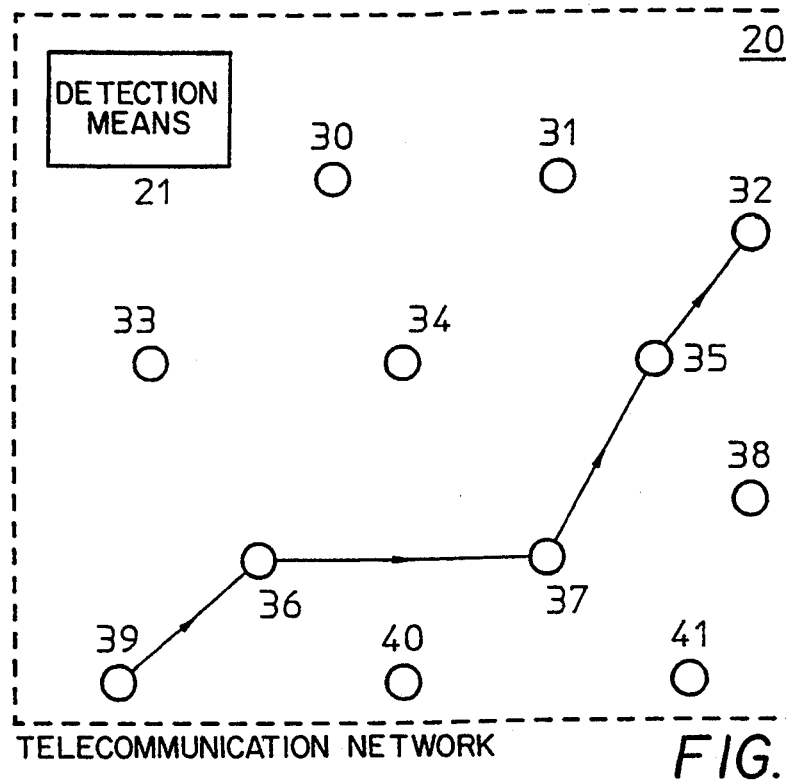
FIGS. 2, 3 shows a telecommunication network according to the invention equipped with nodes and detection means which detect a routing loop.
Figure 3:
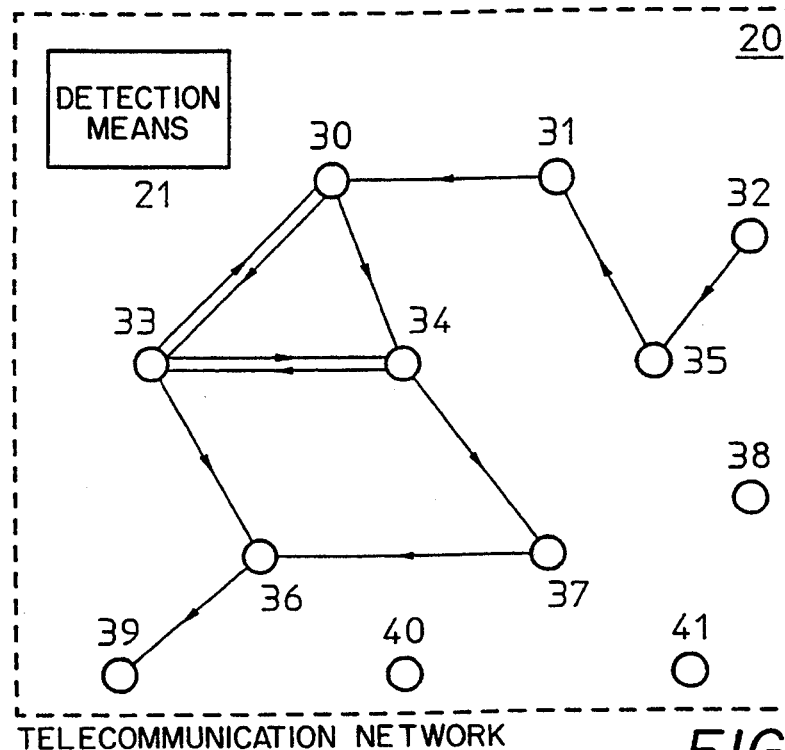

The telecommunication network 20 shown in FIGS. 2 and 3 contains detection means 21 and nodes 30 to 41, inclusive. In FIG. 2, the routing possibilities from the source node 39 to the destination node 32 are shown. The nodes 39 and 36 have a direct, unidirectional routing possibility from the node 39 mentioned first to the node 36 mentioned last. The same applies to the nodes 36 and 37, 37 and 35 and 35 and 32. In FIG. 3, the routing possibilities from the source node 32 to the destination node 39 are shown. The nodes 32 and 35 have a direct unidirectional routing possibility from the node 32 mentioned first to the node 35 mentioned last. The same applies to the nodes 35 and 31, 31 and 30, 30 and 34, 33 and 36, 34 and 37, 37 and 36, and 36 and 39. The nodes 30 and 33 each have a mutual, direct, bidirectional routing possibility to the other and form a so-called miniloop. The same applies to the nodes 33 and 34.

The assembly of a path from source node 39 to destination node 32 as shown in FIG. 2 proceeds as follows. In the node-specific routing information of source node 39, the node 36 is found as the subsequent node situated on the path for the given destination node 32. The parameter t acquires the value 1. Node 36 does not coincide with the destination node 32 and the value of the parameter t is less than the predetermined value which, for this telecommunication network 20, could be set at the value 12 (the number of nodes) or at the value 9 (the largest path length plus 1). In the node-specific routing information of node 36, the node 37 is found as the subsequent node situated on the path for the given destination node 32. The parameter t acquires the value 2. Node 37 does not coincide with the destination node 32 and the value of the parameter t is less than the predetermined value 9. In the node-specific routing information of node 37, the node 35 is found as the subsequent node situated on the path for the given destination node 32. The parameter t acquires the value 3. Node 35 does not coincide with the destination node 32 and the value of the parameter t is less than the predetermined value 9. In the node-specific routing information of node 35, the node 32 is found as the subsequent node situated on the path for the given destination node 32. The parameter t acquires the value 4. Node 32 is the destination node 32 and the path from source node 39 to destination node 32 via the nodes 36, 37 and 35 and having length 4 has consequently been found. No routing loop exists in this path.

The assembly of a path from source node 32 to destination node 39 as shown in FIG. 3, in which case a routing loop will be detected, proceeds as follows. In the node-specific routing information of source node 32, the node 35 is found as the subsequent node situated in the path for the given destination node 39. The parameter t acquires the value 1. Node 35 does not coincide with the destination node 39 and the value of the parameter t is less than the predetermined value 9. In the node-specific routing information of node 35, the node 31 is found as the subsequent node situated on the path for the given destination node 39. The parameter t acquires the value 2. Node 31 does not coincide with the destination node 39 and the value of the parameter t is less than the predetermined value 9. In the node-specific routing information of node 31, the node 30 is found as the subsequent node situated on the path for the given destination node 39. The parameter t acquires the value 3. Node 30 does not coincide with the destination node 39 and the value of the parameter t is less than the predetermined value 9. In the node-specific routing information of node 30, two subsequent nodes situated on different paths, namely node 33 and 34, are found for the given destination node 39 because four different paths are possible from the node 30 to the destination node 39: a first path via node; 33 and 36, a second path via node 33, 34, 37 and 36, which two paths therefore yield the node 33 as the subsequent node, a third path via node 34, 37 and 36, and a fourth path via 34, 33 and 36, which two paths therefore yield the node 34 as the subsequent node. For both nodes, the parameter t acquires the value 4.

Assuming that, of the nodes 33 and 34, the node 33 has the highest priority, the paths via this node are first assembled. In the node-specific routing information of node 33, two subsequent nodes situated on different paths, namely node 36 on the first path and node 34 on the second path, are found for the given destination node 39, and depending on the priority of said nodes 36 and 34, which do not coincide with the destination node 39, both paths are further assembled in a particular order. For both nodes 36 and 34, the parameter t acquires the value 5. In the node-specific routing information of node 36, the node 39 is found as the subsequent node situated on the path for the given destination node 39. The parameter t acquires the value 6. Node 39 is the destination node 39 and the path from source node 32 to destination node 39 via the nodes 35, 31, 30, 33 and 36 and having length 6 has consequently been found. A routing loop does not exist in this first path. In the node-specific routing information of node 34, the node 37 is found as the subsequent node situated on the path for the given destination node 39. The parameter t acquires the value 6. Node 37 does not coincide with the destination node 39 and the value of the parameter t is less than the predetermined value 9. In the node-specific routing information of node 37, the node 36 is found as the subsequent node situated on the path for the given destination node 39. The parameter t acquires the value 7. Node 36 does not coincide with the destination node 39 and the value of the parameter t is less than the predetermined value 9. In the node-specific routing information of node 36, the node 39 is found as the subsequent node situated on the path for the given destination node 39. The parameter t acquires the value 8. Node 39 is the destination node 39 and the path from source node 32 to destination node 39 via the nodes 35, 31, 30, 33, 34, 37, 36 and 39 and having a length 8 has consequently been found. A routing loop does not exist in this second path.

After the paths via node 33 have been assembled, the paths via node 34 are assembled. In the node-specific routing information of node 34 two subsequent nodes situated on different paths, namely node 37 on the third path and node 33 on the fourth path, are found with the given destination node 39, and depending on the priority of said nodes 37 and 33, which do not coincide with the destination node 39, both paths are assembled further in a particular order. For both nodes 37 and 33, the parameter t acquires the value 5. In the node-specific routing information of node 37, the node 36 is found as the subsequent node situated on the path for the given destination node. The parameter t acquires the value 6. Node 36 does not coincide with the destination node 39 and the value of the parameter t is less than the predetermined value 9. In the node-specific routing information of node 36, the node 39 is found as the subsequent node situated on the path for the given destination node. The parameter t acquires the value 7. Node 39 is the destination node 39, and the path from source node 32 to destination node 39 via nodes 35, 31, 30, 34, 37 and 36 and having a length 7 has consequently been found. A routing loop does not exist in this third path. In the node-specific routing information of node 33, two subsequent nodes situated on different paths, namely nodes 36 and 30, are found for the given destination node 39, and depending on the priority of said nodes 36 and 30, which do not coincide with the destination node 39, both paths are assembled further in a particular order. For both nodes 36 and 30, the parameter t acquires the value 6. The fourth path therefore appears to contain different paths which have been split up. In the node-specific routing information of node 36, the node 39 is found as the subsequent node situated on the path for the given destination node 39. The parameter t acquires the value 7. Node 39 is the destination node 39, and the path from source node 32 to destination node 39 via nodes 35, 31, 30, 34, 33 and 36 and having a length 7 has consequently been found. A routing loop does not exist in this splitting-up of the fourth path. In the node-specific routing information of node 30, the node 34 is found as the subsequent node situated on the path for the given destination node 39. The parameter t acquires the value 7. Node 34 does not coincide with the destination node 39 and the value of the parameter t is less than the predetermined value 9. In the node-specific routing information of node 34, two subsequent nodes situated on different paths, namely node 37 and 33, are found as before, for the given destination node 39, and depending on the priority of said nodes 37 and 33, which do not coincide with the destination node 39, both paths are assembled further in a particular order. For both nodes 37 and 33, the parameter t acquires the value 8. From whichever of the paths 37 and 33 a path is now assembled further (and how a path, if any, is assembled from node 33) is irrelevant: before the destination node 39 is reached, the parameter t acquires the value 9, which indicates the existence of a routing loop in the partly assembled path. This loop comprises the nodes 30, 34, 33, 30, 34 etc. and could be eliminated in a simple manner either by eliminating the unidirectional routing possibility from node 30 to 34 and, as a consequence thereof, the unidirectional routing possibility from node 33 to 34 and from node 34 To node 33, in which case the routing possibilities in the opposite direction between the four nodes mentioned last should continue to exist, or by eliminating only the unidirectional routing possibility from node 33 to 30, in which case the routing possibility in the opposite direction between the nodes mentioned last should continue to exist.

Figure 4:
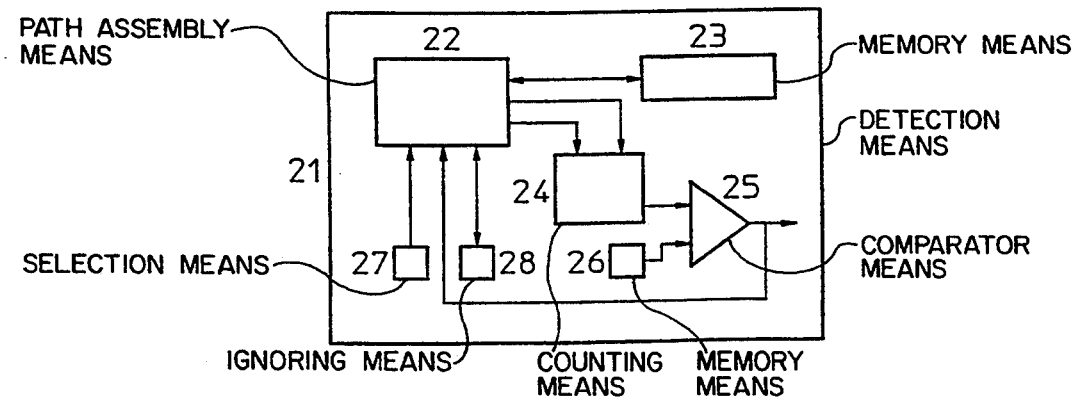
FIG. 4 shows a more detailed reproduction of the detection means.

The detection means 21 shown in FIG. 4 comprise path assembly means 22 for assembling a path from a source node, on the one hand, to a destination node, on the other hand, on the basis of the node-specific routing information associated with the source node and the node-specific routing information associated with the nodes situated on the path. Path assembly means 22 are coupled to memory means 23 in which the node-specific routing information is stored, and they are coupled to counting means 24 for increasing a counter position by one counter unit at each subsequent node situated on a path during the assembly of said path. For this purpose, counting means 24 receive, from path assembly means 22, a counting pulse at a first input and a counter position, to be loaded and associated with a particular node, at a second input. An output of the counting means 24 is coupled to a first input of comparator means 25 for comparing the counter position associated with a partly assembled path with a predetermined counter value and for generating an alarm system in the event of it being exceeded, the predetermined counter value x being stored in memory means 26, which are coupled to a second input of comparator means 25. An output of comparator means 25 is coupled to path assembly means 22 for supplying the alarm signal. Path assembly means 22 are furthermore coupled to selection means 27 for successively selecting all the nodes as the destination node and for successively selecting all the remaining nodes as the source nodes for each destination node selected, and to ignoring means 28 for ignoring at least one of the two routing possibilities in the assembly of a path in the case of two nodes which are situated on the path to be assembled and which each have a direct routing possibility to the other in their routing information.

In this connection, memory means 23 reproduce the memories of all the nodes symbolically if a routing loop is to be detected by actually assembling the path. If a routing loop is to be detected by assembling paths in a simulated manner, memory means 23 could also be formed by a central memory in which the node-specific routing information of all the nodes is stored.

We claim:

1. Method of detecting a routing loop in a telecommunication system equipped with nodes, each containing node-specific routing information, comprising the steps of:

assembling a path from a source node, on the one hand, to a destination node, on the other hand, on the basis of the node-specific routing information associated with the source node and the node-specific routing information associated with the nodes situated on the path, during the assembly of the path, increasing a parameter of said path at each subsequent node situated on said path by one unit, comparing the parameter, expressed in a number of units, of a partly assembled path with a predetermined value, and detecting the partly assembled path whose parameter exceeds said value as a path containing a routing loop.

2. Method according to claim 1, wherein of two nodes which are situated on the path to be assembled and which each has a direct routing possibility to the other in their routing possibility, using not more than one of the two routing possibilities in assembling the path.

3. Method according to claim 2, wherein said detecting step includes selecting all the nodes to function successively as the destination node, and selecting all the remaining nodes to successively function as the source node for each selected destination node.

4. Telecommunication network comprising:

a plurality of nodes which each contain node-specific routing information, and detection means comprising path assembly means for assembling a path from a source node, on the one hand, to a destination node, on the other hand, on the basis of the node-specific routing information associated with the source node and the node-specific routing information associated with the nodes situated on the path, wherein the detection means further comprises:

counting means for increasing a counter position by one counting unit at each subsequent node situated on the path during the assembly of said path, and comparator means for comparing the counter position associated with a partly assembled path with a predetermined counter value and for generating an alarm signal in the event of said predetermined counter value being exceeded.

5. Telecommunication network according to claim 4, wherein the detection means includes ignoring means for ignoring at least one of the two routing possibilities in the assembly of the path in the case of two nodes which are situated on the path to be assembled and which each has a direct routing possibility to the other in their routing information.

6. Telecommunication network according to claim 5, wherein the detection means includes selection means for successively selecting all the nodes as the destination node and for successively selecting all the remaining nodes as the source node for each destination node selected.

7. Detection means for use in a telecommunication network, comprising:
 path assembly means for assembling a path from a source node, on the one hand, to a destination node, on the other hand, on the basis of node-specific routing information associated with the source node and node-specific routing information associated with the nodes situated on the path, and
 detection means comprising path assembly means for assembling a path from a source node, on the one hand, to a destination node, on the other hand, on the basis of the node-specific routing information associated with the source node and the node-specific routing information associated with the nodes situated on the path, wherein the detection means further comprises:
 (a) counting means for increasing a counter position by one counting unit at each subsequent node situated on the path during the assembly of said path, and
 (b) comparator means for comparing the counter position associated with a partly assembled path with a predetermined counter value and for generating an alarm signal in the event of it being exceeded.

8. Detection means according to claim 7, wherein the detection means includes ignoring means for ignoring at least one of the two routing possibilities in the assembly of the path in the case of two nodes which are situated on the path to be assembled and which each has a direct routing possibility to the other in their routing information.

9. Detection means according to claim 8, wherein the detection means includes selection means for successively selecting all of the nodes as the destination node and for successively selecting all the remaining nodes as the source node for each destination node selected.

* * * * *